United States Patent

[11] 3,582,889

[72] Inventor Pierre Bodez
Paris, France
[21] Appl. No. 855,203
[22] Filed Sept. 4, 1969
[45] Patented June 1, 1971
[73] Assignee C.I.T.-Compagnie Industrielle Des Telecommunications
Paris, France
[32] Priority Sept. 4, 1968
[33] France
[31] 165070
Continuation-in-part of application Ser. No. 639,570, May 18, 1967, now abandoned.

[54] DEVICE FOR IDENTIFYING A FINGERPRINT PATTERN
36 Claims, 14 Drawing Figs.

[52] U.S. Cl. .......... 340/146.3E
[51] Int. Cl. .......... G06r 9/00
[50] Field of Search .......... 340/146.3

[56] References Cited
UNITED STATES PATENTS
3,202,965 8/1965 Nadler .......... 340/146.3
3,292,149 12/1966 Bourne .......... 340/146.3

*Primary Examiner*—Thomas A. Robinson
*Attorney*—Craig, Antonelli, Stewart & Hill ABSTRACT: A cliche bearing a fingerprint is scanned by a flying spot moving along a network of successive horizontal lines by an industrial television camera. The display signal obtained, corresponding to a section cut off along 15 successive lines, is stored in the form of a logical signal in a data processing storage unit in which a certain number of data processing operations enable the identification, firstly of the end points of a fingerprint line, to determine which of these points are the most characteristic and to calculate the tangent to the fingerprint line at these points.

DEVICE FOR IDENTIFYING A FINGERPRINT PATTERN

This invention relates to a device for identifying a pattern, and particularly but not exclusively a fingerprint pattern, consisting of lines and points on the lines which are significant of the pattern, and is more specifically concerned with a modification of or improvement in the invention of copending application Ser. No. 639,570, filed May 18, 1967, now abandoned, hereinafter referred to as the parent application, of which the present application is a continuation-in-part application.

The parent application describes and claims a device for coding fingerprints for purposes of identification including a coder and logic circuitry for expressing a fingerprint in the form of numerical data significant of points on the print which are characteristic points (as herein defined), a store for recording the data, a library for storing of fingerprints previously coded and identified, and means for comparing the data of an unknown fingerprint held in the store with data of the fingerprint stored in the library, the comparison being effected by selecting a group of data from the store arranged in a repeatable order, and selecting a similar group of data from the library arranged in analogous order, and comparing the group from the store with the group from the library.

The device specifically described in the parent application was equipped with a complex arrangement for scanning an image of a fingerprint with which a horizontal strip of the image was analyzed by means of a succession of stepped sawtooth pulses, the following strip being analyzed by means of another series of stepped sawtooth pulses staggered in height by a fraction of the height of this strip.

An object of the present invention is to improve the device described in the parent application.

In accordance with the invention there is provided a device for identifying a pattern consisting of lines and points on the lines which are significant of the pattern, the device comprising: a coder for receiving the pattern to be identified and arranged to produce electrical signals each significant of a point on the pattern; first circuitry for rejecting points which are not singular (as herein defined); second circuitry for rejecting at least some points which are not characteristic (as herein defined); third circuitry for examining each singular point not rejected by the first or second circuitry and arranged to calculate the slope of the tangent to the pattern line at that point relative to an arbitrary reference axis and to reject that point if identified as being noncharacteristic; fourth circuitry for rejecting leading points (as herein defined) examined by the third circuitry, arranged to pass only characteristic points to its output; fifth circuitry for selecting a group of a preselected number of characteristic points arranged in a predetermined order and calculating, from the arbitrary tangent slopes and coordinates of the points, data significant of a closed figure with straight sides joining the points in the predetermined order; and sixth circuitry for comparing data significant of at least one such figure of the unknown pattern with data significant of such figures of known patterns, and for indicating coincidence of the unknown pattern with a known pattern when a preselected number of such figures are common to the two patterns.

The first circuitry is preferably connected to receive the coder output signals via a processing memory for temporarily retaining a prescribed number of said signals in a matrix array; the first circuitry is suitably in the form of a singular point detector for examining in turn each of the signals in the matrix array together with a prescribed number of neighboring signals and for identifying from such examination any signals significant of singular points; the first and second circuitries are suitably connected via a singular point memory for temporarily holding signals significant of any singular points identified by the singular point detector; a monitor is preferably provided for controlling operation of the singular point memory and singular point detector; the second circuitry and third circuitry are suitably combined in a characteristic point detector for determining, from the signal significant of a singular point stored in the singular point memory and from the signals significant of points surrounding said singular point, the slope of the tangent to the pattern line at said point; the fourth circuitry is suitably in the form of a leading point detector for examining a relatively large area around each point to determine if it is a leading point, and arranged to cancel any leading points appearing at the output of the characteristic point detector, thereby allowing only characteristic points to take part in the identification process; the device suitably includes a recorder for making a record of the coordinates and tangent slopes of any characteristic points, an arrangement for transferring such details of the characteristic points into a library for permanent storage, and a timer providing signals for synchronizing the operation of the elements of the device.

A characteristic point is a point situated at the extreme end of a fingerprint line, or at the junction point of two fingerprint lines which merge.

A singular point is a point which satisfies prescribed logical conditions, in that if the pattern is represented by a matrix array of signals having either the logical value $v$ or the logical value $\overline{v}$, a point is a singular point if the signal corresponding to it has the logical value $v$ and of its eight immediate neighbors in the matrix array the number with the logical value $vr$ is between 3 and 7 inclusive.

The device of the parent application was equipped with a scanning arrangement in which a horizontal strip of the pattern was analyzed by means of a succession of stepped sawtooth pulses, the following horizontal strip being analyzed by means of another series of stepped sawtooth pulses standard in height by a fraction of the height of the strip. The present device, in order to simplify the device and reduce its cost, uses a conventional industrial television camera to scan an image of the pattern by means of successive horizontal scanning lines. This modification has introduced differences in the indexing of the points of the pattern, and in the identification circuits. As in the parent application the scan provides streams of video-logical signals each of which has a logical value of either "0" or "1," by means of a threshold circuit.

The present device includes a processing memory, formed by N1 shift registers having N2 divisions, which receives and retains for a period referred to as a processing interval, the logical values of the video-logical signals from N2 points on each of N1 vertical analysis steps. A vertical analysis step is formed by a preselected number of successive horizontal scanning lines.

The signals contained in the processing memory represent a window on the pattern to be identified, the window being lowered by one vertical analysis step after each processing interval. After lowering by N3 analysis steps, a complete vertical strip of the pattern has been scanned. An adjacent vertical strip is then scanned by displacing the window laterally by approximately half the width of a vertical strip, and repeating the process. The pattern as a whole is covered by scanning N4 vertical strips.

The present device includes an arrangement for transferring into a cyclic shift register comprising eight divisions the logical values of eight divisions surrounding a preselected division of the processing memory. Also included are means for causing the information transferred to the cyclic register to be cycled and means for deciding if the signal in said preselected division corresponds to a singular point.

Further means are provided for receiving the singular points identified, screening the singular points to reject all the points which are not characteristic, and for recording the coordinates of each characteristic point together with the slope of the tangent to the print line at each characteristic point, relative to arbitrary reference axes.

The invention will now be described in more detail, by way of example, with reference to the accompanying diagrammatic drawings, in which.

Figure 1:
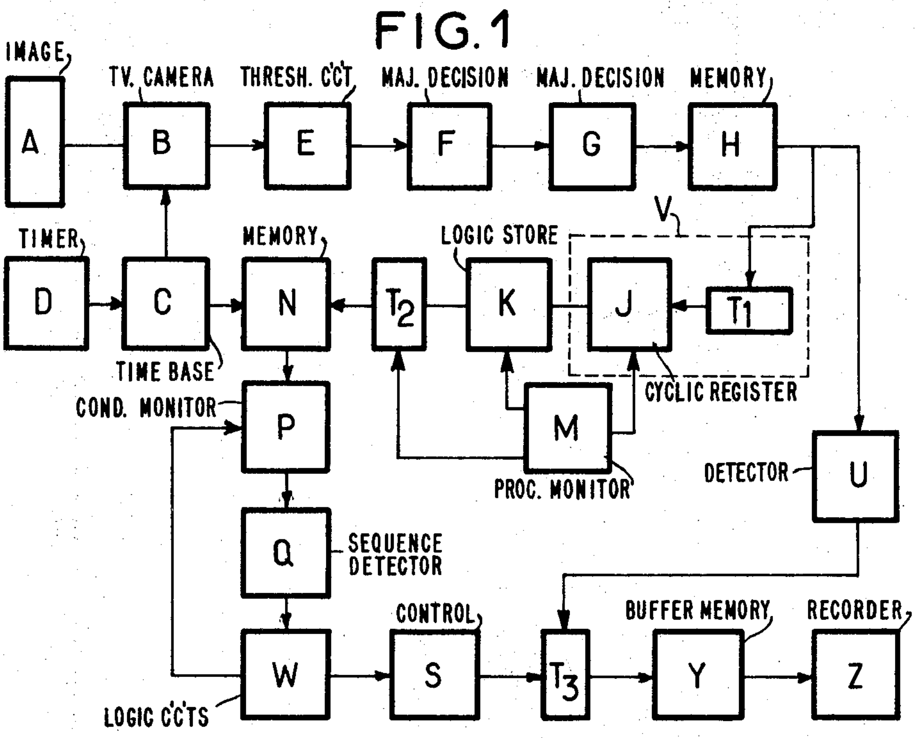
FIG. 1 is a block diagram of apparatus for coding a fingerprint.

Referring to FIG. 1, an image of the fingerprint to be coded is displayed at A to a coder having a television camera B equipped with horizontal and vertical scanning circuits. The operation of the camera is controlled by means of a time base C synchronized by a timer D. The time base contains two counters $C_1$, $C_2$ for defining the coordinates of a point on the fingerprint.

After passing through a threshold circuit E, each video signal transmitted by the camera B becomes a logical video signal with a logical value of "0" or "1." Each such signal is referred to hereafter as a signal *a*. The signals *a*, grouped in threes corresponding to a horizontal line element are applied to a first majority decision circuit F. This operation results in dividing the horizontal definition by 2, and has the advantage of eliminating isolated interference signals which would disturb the coding. A further majority decision operation, in the vertical direction, is performed in an element G, which halves the vertical definition.

The logical video signals from the majority decision circuits and denoted *e* are then received in a processing memory H which is an assembly of shift registers in matrix arrangement.

Groups of signals from processing memory H are transferred to a singular point detector V. The signals are transferred by a transfer circuit $T_1$ to a cyclic register J, which under the control of a processing monitor M cooperates with the processing memory H to detect singular points, by means of predetermined logic conditions recorded in an element K. Each singular point found on a line segment is noted temporarily in a memory N of a singular point memory 5.

The identification of characteristic points is performed by a characteristic point detector Q, under the control of a condition monitor P. The identification is effected by the cooperation of the elements Q, for detecting sequences of the same logical value in different registers of the processing memory H, and W, which contains simple logical circuits providing predetermined logical decision functions.

If a point is recognized as being characteristic, it coordinates are held in a recorder V by being transferred into a buffer memory Y, through a transfer circuit $T_3$, on receipt of instructions from an element S.

A circuit U is provided for detection of "leading" points, which are points considered to be characteristic but which in reality form parts of a spot on the fingerprint image.

The coordinates of a characteristic point and data significant of the tangent at the point are recorded by an element Z.

Figure 2:
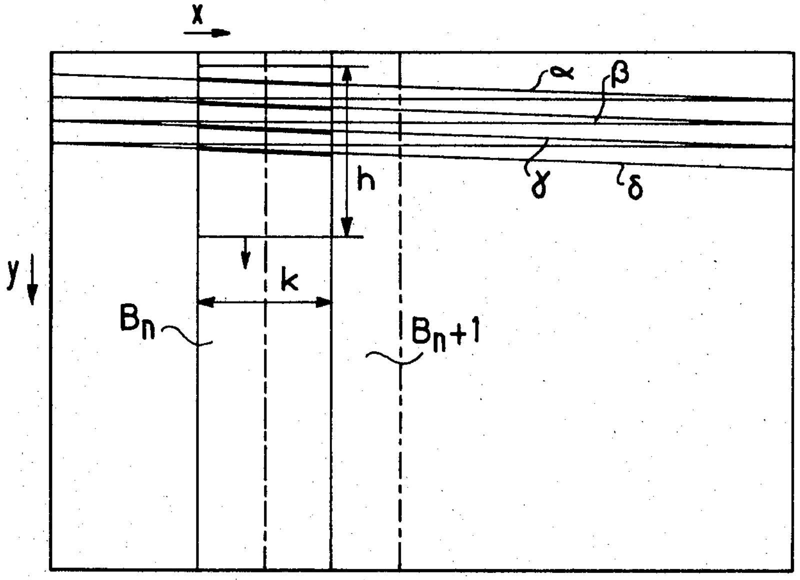
FIG. 2 is a diagram showing the manner in which the image of the fingerprint to be studied is scanned.

Referring to FIG. 2, which shows how the fingerprint image is scanned, on a line $\alpha$ scanned horizontally, signals are picked up over a segment having a length *k*. The same pickup area or window covers a certain number of successive lines $\beta$, $\Gamma$, $\gamma$ and so on, spanning a height *h*. The height *h* of a pickup area corresponds to $N_1$ vertical analysis steps. Because of the majority decision, a vertical analysis step corresponds to two scanning lines.

$2N_2$ individual points are defined initially in the direction *x* over the width *k* of each line $\alpha$, $\beta$ and so on. Because of the majority decision, a horizontal analysis step corresponds to two individual points. $N_2$ logical video signals are thus picked up along each line segment.

During a complete scan of the fingerprint image, a window corresponding to $N_2$ signals picked up horizontally through $N_1$ vertical steps is stored in the memory H. In this embodiment $N_1$ is equal to 13 and $N_2$ is equal to 15. The pickup area thus defines an almost square window on the document.

During the following complete scan the pickup area descends by one vertical analysis step, that is to say by two scan lines. This downward movement continues from the top towards the bottom of the image, to define a vertical strip on the image during $N_3=183$ successive scans. After this, a pickup operation is performed on an adjacent strip by horizontal displacement of the window by approximately half the width of a strip. The complete image is covered by $N_4=35$ strips.

The original abscissa of a strip is defined by a number *g*, with $0 \leq g \leq 34$. The distance between each point and the original abscissa of a strip is marked *j*, with $1 \leq j \leq 15$. The abscissa *x* of a point is thus given by: $x=g+j$. The logical video signals from each pick-up area or window are examined by means of the processing memory H of FIG. 1, which comprises 13 shift registers corresponding to the 13 vertical analysis steps, each comprising 15 divisions corresponding to 15 individual signals per line segment. The contents of the processing memory remain unchanged for a period referred to as the processing period.

Figure 3:
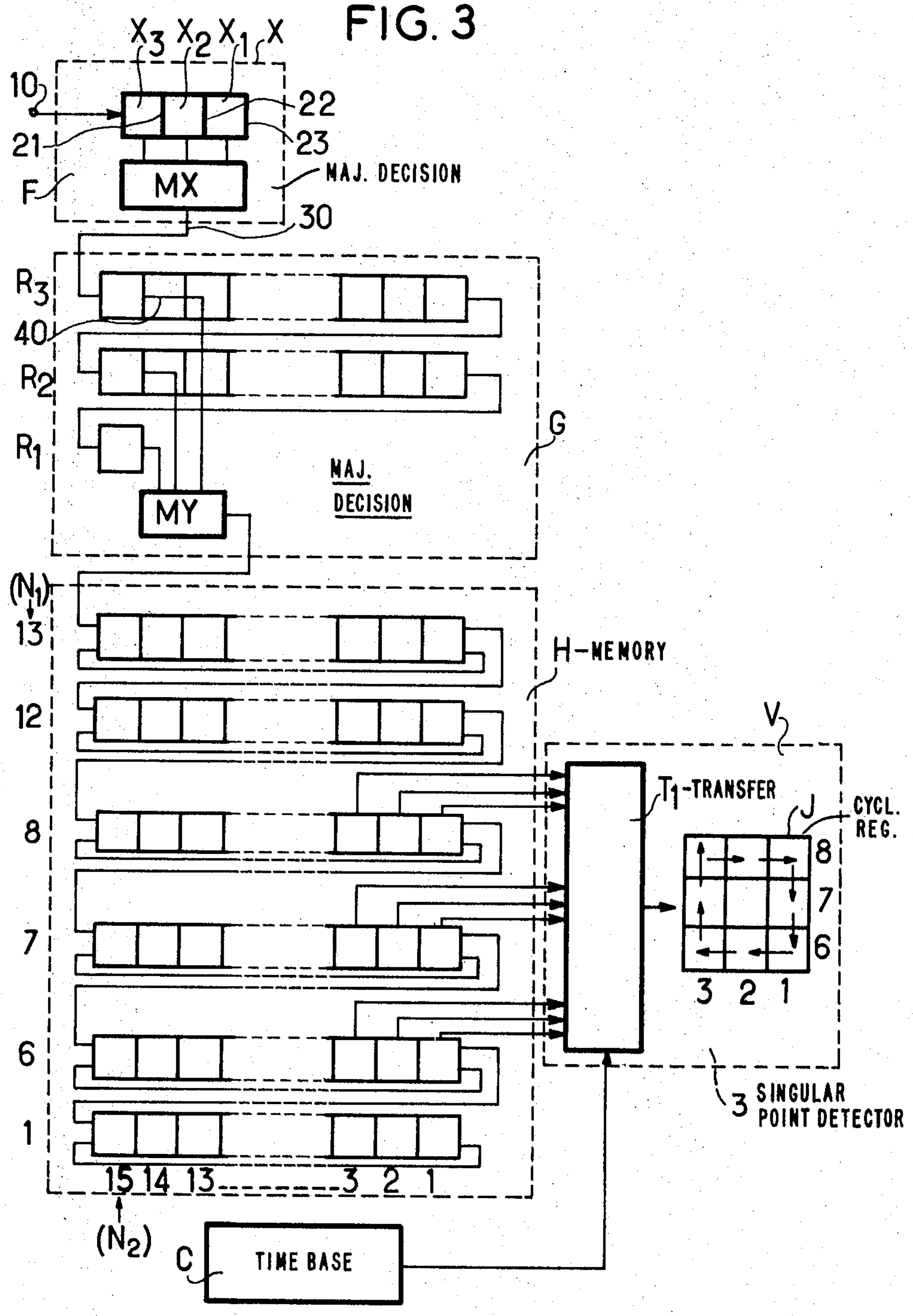
FIG. 3 is a more detailed diagram of the parts F, G, H, J, of FIG. 1.

Referring to FIG. 3, which is a block diagram of the subassemblies F, G, H, J of FIG. 1, subassembly F contains a shift register X comprising three divisions $X_1$, $X_2$, $X_3$ and cooperating with a majority decision circuit MX.

The logical video signal from the threshold circuit E, shown in FIG. 1, appearing at a given instant *i*, is denoted $a^i$. It passes into the division $X_3$ of the shift register X, where it is preceded by the signal $a^{i11}$ in the division $X_2$, and by the signal $a^{i12}$ in the division $X_1$.

The advance in the register X occurs under the control of a line which is not shown, at a frequency of 15 MHz. The same frequency of advance is used for the circuit MX which performs the logical operation:

$$b^j=a^i \cdot a^{i11}+a^{i11} \cdot a^{i12}+aai^{12} \cdot a^i$$

If two of the *a*'s have the value 0 and a single one has the value 1, the output signal of the circuit F is 0. If two of the *a*'s have the value 1 and a single one has the value 0, the output signal is 1. A majority decision circuit of this kind is able to eliminate isolated interference signals which can occur fortuitously in a succession of identical logical values. It provides a sequence of logic signals $b^j$, at intervals of *j* which are twice as long as the intervals *i*.

Figure 4:
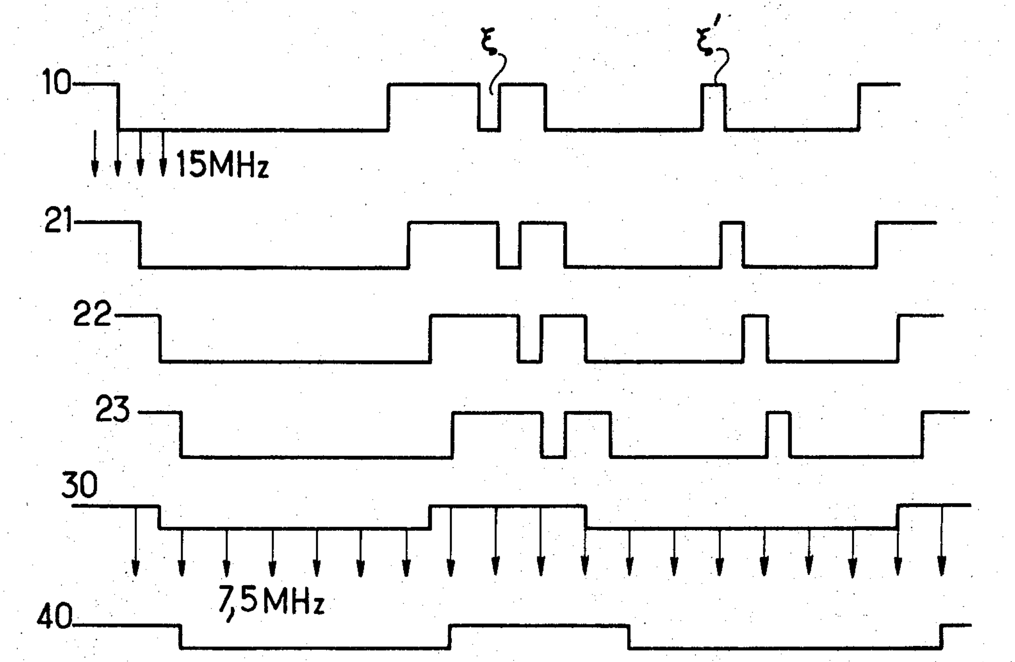
FIG. 4 is a graph explaining the operation of certain circuits of FIG. 3.

FIG. 4 shows the form of the signals obtained at the points 10, 21, 22, 23, 30 and 40 of FIG. 3. The signals are marked by the same references.

The signals at 10, issuing from the threshold circuit E comprise, for example, two interference signals 10*a* and 10*b*, indicated by an isolated logical value in a sequence of opposite value. These signals, at the frequency 15 MHz., give rise to the corresponding signals 21, 22, 23 in the divisions $X_3$, $X_2$, $X_1$ of the register X.

Signals from which the interference signals have been eliminated are observed at 30, the output point of the majority decision circuit F. This signal is sampled at a frequency of 7.5 MHz. at 40. The majority decision method causes half the definition to be lost. This is the price to be paid for the elimination of isolated interference signals.

The adoption of the frequency of 7.5 MHz. results in more economical circuitry than retention of the original frequency of 15 MHz.

Each signal at 40, separated from neighboring signals by an interval $j$ and sampled at the frequency of 7.5 MHz., is referred to as signal $b^j$.

Referring again to FIG. 3, the subassemblies G and H include shift registers with 15 divisions indexed according to the scale 1, 2, 3, 4...13, 14, 15 plotted at the bottom of the Figure and serving the purpose of identifying the order of the divisions in all registers.

The subassembly G is formed by three shift registers $R_3$, $R_2$, $R_1$, the first two having 15 divisions, and the last having a single division. The divisions of $R_3$ are marked $R_3^1...R_3^{15}$. The divisions of $R_2$ are marked $R_2^1...R_2^{15}$. $R_1$ has a single division $R_1^{15}$.

The signals $b^j$ traverse the register $R_3$, then the register $R_2$, and then the single division of the register $R_1$. All the signals $b^j$ representing an area pickup thus pass successively into $R_1$. In $R_2$ are successively stored the signals representing each preceding vertical analysis step, and in $R_3$ are successively stored those of each vertical analysis step preceding the latter. The signals which are generated first carry the lowest indices, which is why the data are fed first into a register marked $R_3$, then pass into $R_2$ and thereafter reach $R_1$.

A majority decision operation is performed by the circuit MY on the signals $b^j$ of the divisions $R_3^{15}$, $R_2^{15}$, $R_1^{15}$. This results in a division by 2 of the number of analysis steps in the vertical direction $y$.

By eliminating one point in two in the horizontal direction $x$, then one line in two in the vertical direction $y$, equivalent definitions are obtained in the two directions.

The subassembly G performs the logical operation:

$$e^j = b_1^j \cdot b_2^j + b_2^j \cdot b^j + b_3^j \cdot b_1^j$$

in which the indices 1, 2, 3 relate to the registers R having the same index.

The processing memory H contains 13 shift registers, marked $L_u^v$ where $u$ indicates a register number passing from 13 to 1 from the bottom towards the top, and $v$ a division number, passing from 15 to 1 from the left towards the right, as shown in the diagram.

The Figure has been simplified by omitting some of the matrix elements of the memory H.

The corresponding signals in memory H are referred to as $e_u^v$.

The signals issuing from the subassembly G enter the division 15 of the register $L_{13}$, traverse the entire register $L_{13}$ from the division $L_{13}^{15}$ to the division $L_{13}^1$, then the entire register $L_{12}$ from the division $L_{12}^{13}$, and so on up to the register $L_1$.

If $t$ is the duration of a cycle at the frequency of 7.5 MHz. ($t$=133 *ns.*), 340$t$ elapses between two passages of the scanning point past the same abscissa on two successive lines. Since a vertical analysis step comprises two lines, 680$t$ elapses before another line segment has been committed to a memory. Since the storage of 15 signals lasts 15$t$, a period of (680$t$−15$t$) of 665$t$ remains available for analysis.

The singular point detector 3 contains a transfer circuit $T_1$ and a cyclic shift register J having eight divisions illustrated in rectangular ring form. The divisions of register J are identified by indices 8, 7, 6 in the vertical direction and 3, 2, 1 in the horizontal direction.

When the processing memory H is filled completely the transfer circuit $T_1$, which may be of any known type, under instructions from the time base C transfers the signals $e_8^3$, $e_8^2$, $e_8^1$ into the corresponding divisions $J_8^3$, $J_8^2$, $J_8^1$, the signal $e_7^3$ into the division $J_7^3$, the signal $e_7^1$ into the division $J_7^1$, and the signals $e_6^3$, $e_6^2$, $e_6^1$ into the corresponding divisions $J_6^3$, $J_6^2$, $J_6^1$.

The signal $e_7^2$ is not transferred since the register J is a ring register and not a matrix layout. The function of the register J is to recognize whether the signal $e_7^2$ is significant of a singular point, that is to say a point which may be considered as the "-terminus" of a print line.

Topological considerations show that the signal $e_7^2$ is significant of a singular point if, of the eight immediately surrounding signals, there are $n$ which have the opposite logical value to $e_7^2$, with the condition:

$$4 \leq n \leq 7 \text{ --- } (1)$$

Figure 5:
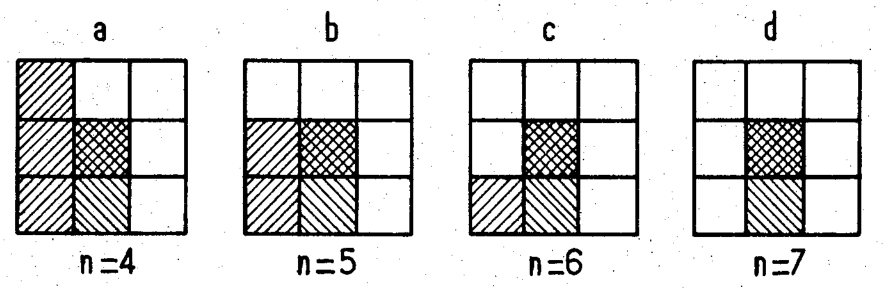
FIG. 5 is a set of outlines explaining the operation of the element J of FIG. 3.

This is demonstrated in FIG. 5 in which the four configurations (*a*), (*b*), (*c*), (*d*) correspond respectively to the cases $n$=4, $n$=5, $n$=6, $n$=7.

The process for detection of the singular points evidently has an axis of symmetry of the order 8. For this reason, the information contained in cyclic register J is caused to cycle eight times as shown by the arrows in FIG. 3, to check whether in one of the eight positions the information contained in Z complies with a defined logical condition which practically expresses the above condition (1).

During the processing, the information contained in each register of the processing memory H is cycled as shown by the broken lines drawn under each register in FIG. 3. Through division $L_7^2$ thus pass in 13 successive stages the signals contained (at the beginning of the processing) in the divisions $L_7^2$ to $L_7^{14}$. The divisions $L_7^1$ and $L_7^{15}$ are excluded since the environment of these points is not fully contained in the memory. Each of these 13 successive stages corresponds to a value of $j$ between 2 and 14.

For each of these 13 successive states of the register $L_7$, eight cycles are performed of the information in the register J. Each cycle lasts 10$t$, requiring intervals of 1$t$ for transfer of new information into register J; 8$t$ for cycling the information in register J; and 1$t$ for recording $j$ if a singular point has been detected.

Figure 6:
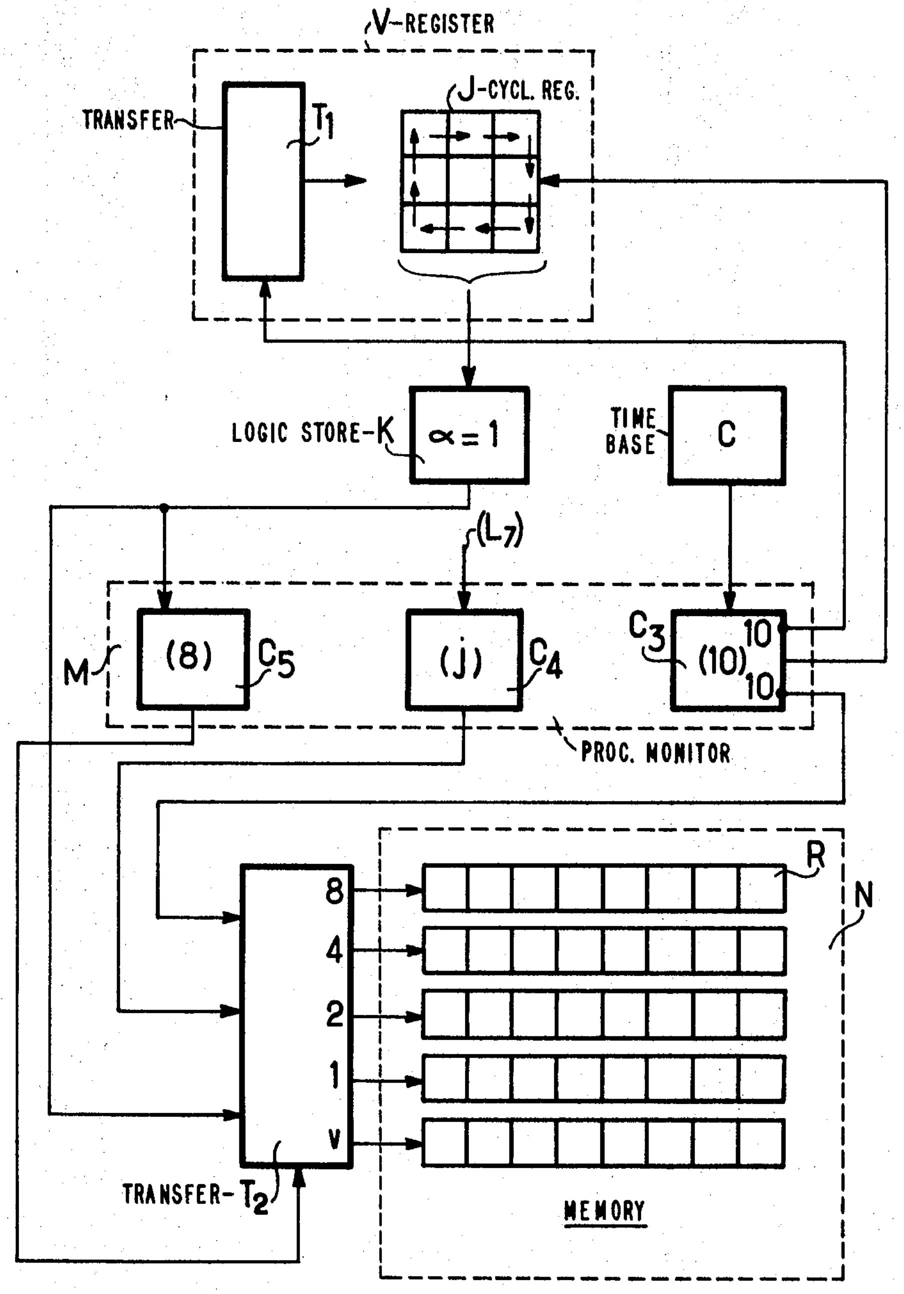
FIG. 6 is a simplified diagram of the subassemblies K, M, N of FIG. 1.

Referring to FIG. 6, the element K is a logical circuit which at its input point receives the logical value in division $L_7^2$ and the values of the signals $u$ in the eight divisions of register J, and which establishes the logical function:

$$K = e_7^{\bar{2}} \cdot u_6^{\bar{2}} \cdot u_6^3 \cdot u_7^3 \cdot u_8^3 \cdot u_8^2 + e_7^2 \cdot u_6^2 \cdot u_6^{\bar{3}} \cdot u_7^{\bar{3}} \cdot u_8^{\bar{3}} \cdot u_8^{\bar{2}}$$

When K equals 1, there is a series of $n(4 \leq n \leq 7)$ consecutive logical values opposite to that in $L_7^2$. If $K$ is equal to 1 for one of the eight configurations of register J, the point instantaneously occupying division $L_7^2$ is a singular point.

The processing monitor M contains three counters $C_3$, $C_4$, $C_5$. The counter $C_3$ is a counter in decades which by its different states, consecutively actuates the transfer into register J (1$t$), the cycling in register J (8$t$), and, if a singular point has been detected, the recording of the coordinate $j$. The counter $C_4$ identifies the instantaneous value $j$ of the point under processing, in the course of the successive cycles of the signals in the register $L_7$.

The counter $C_5$ provides a number of supplementary pulses, that number being the difference between 8 and the number of singular points identified in the course of one processing operation in J.

The element N is a memory controlled by a transfer circuit $T_2$. When the count of counter $C_3$ is 10, the transfer circuit $T_2$ operates to transfer the information $j$ from counter $C_4$ into the memory N, which is a provisional memory. The circuit $T_2$ also transfers the logical value of the point in question into N.

The memory N contains five shift registers, each having eight divisions. The register V records the logical value of a singular point. The four other registers, marked 1, 2, 4, 8 record the value $j$ of said singular point. The coordinate $g$ is supplied by a strip counter $C_1$ situated in the time base C. The coordinate $y$ is supplied by a line counter $C_2$ also situated in the time base assembly C.

The first five divisions of the registers of memory N are arranged to identify a maximum of five singular points. Statistical considerations show that the probability of there being more than five singular points per processing action is practically nil. The number of singular points will never reach eight; it will rarely reach five, and will not exceed three as a rule.

During the supplementary pulses supplied to memory N by counter $C_5$, the output of memory N indicates the value 0.

This cannot be a value of $j$, which is between 2 and 14. The detection of a 0 at the output of memory N reports that all the singular points have been processed.

At the end of 13 cycles of $10t$, all the interesting points of $L_7$ have been checked. The monitor M then provides two additional advance orders to restore the register $L_7$ to its initial state; the register $L_7$ progresses by 13 steps, and 15 are needed to make a complete turn.

Figure 7:
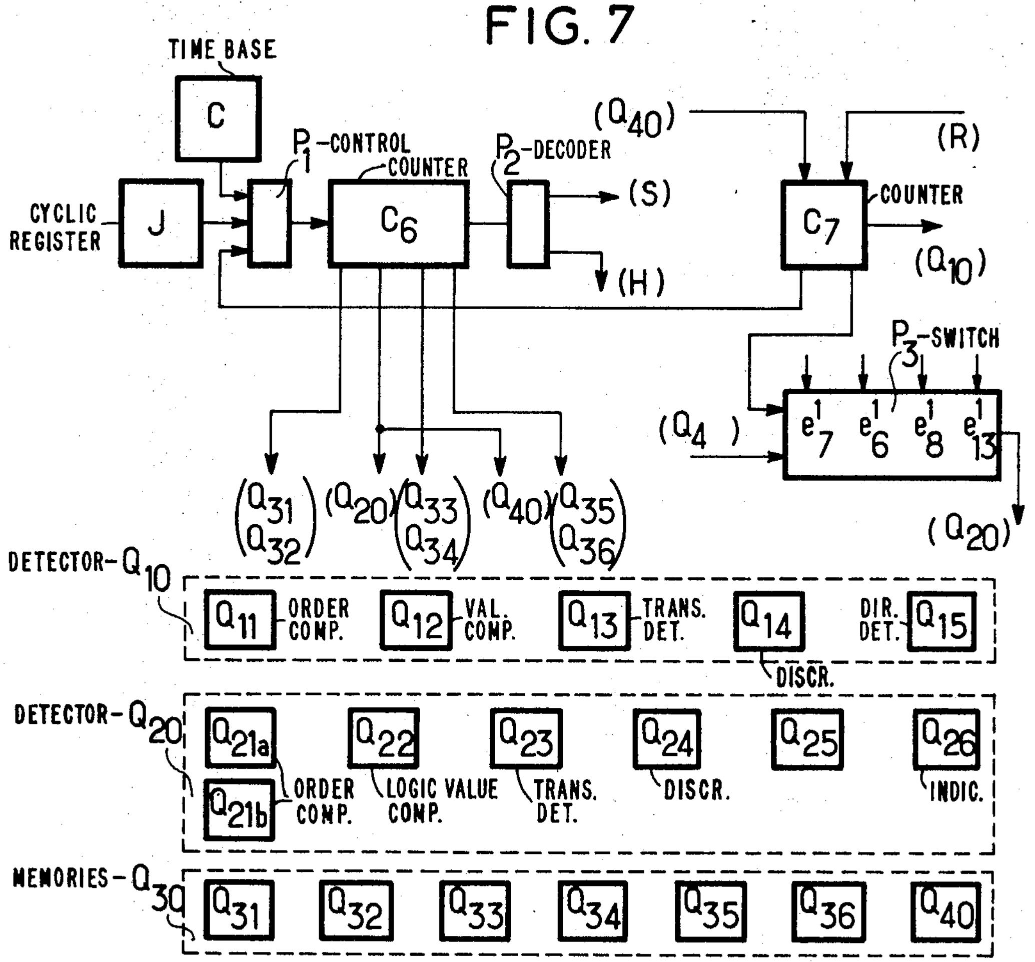
FIG. 7 is a simplified diagram of the subassemblies P and Q of FIG. 1.

The problem which remains to be dealt with by the apparatus shown in FIG. 7 is a triple one:

1. to "follow" the outline of the print line in the other registers, at one side or the other of $L_7$;
2. once the configuration of the outline is found, to compare the same to predetermined conditions, to decide whether the singular point detected and stored in a memory N is to be retained as a characteristic point;
3. to calculate the semitangent by a method most appropriate to the position of the print line.

These operations are performed by means of the condition monitor P, and the sequence detector Q.

FIG. 7 does not show all the interconnections of its component elements. A task of this kind would have caused considerable lengthening of this statement, and appeared to be unnecessary in conveying to an experienced engineer a sufficiently precise idea of the structure and operation of the example of the apparatus according to the invention at present being described.

The condition monitor P comprises counters $C_6$ and $C_7$ and an analysis switch $P_3$.

The counter $C_6$ is a conventional counter having a capacity 21. It makes it possible to generate a definite sequence of orders recurring at intervals of $21t$. It is equipped with a control device $P_1$ and with a decoding device $P_2$.

The control device $P_1$ enables the counter to start up under the action of a signal generated automatically by the circuits of register J at the end of the processing. They equally enable the counter to stop either when there is no other singular point to be processed, or when the time is insufficient (before the expiring of the period $680t$) to deal with the following points. The latter is indicated by an "end of available time" signal from counter $C_2$. The signal $j=0$ indicating no further singular points is detected at the output point of the memory N.

The decoding device $P_2$ decodes the state 19 of the counter by recopying the state 19, decodes the states 16 to 20, and generates an order allowing the information to cycle in the processing memory H.

In a sequence of $21t$, from $t=1$ to $t=15$ the information cycles in $L_p$, which then operates as a ring register. During this cycling, the values $s_p^a$ and $s_p^b$ are recorded in their corresponding memories thanks to orders supplied by the element Q, where $s_p^a$ and $s_p^b$ are respectively the values of $j$ at the beginning and end of a sequence of the same logical values in register $L_p$. From $t=16$ to $t=18$, the equilibrium condition is expected for the logic circuits which establish the simple or complex logical conditions. This pause is required by the complexity of the logical operations to be performed.

The logical results are exploited at $t=19$. The state 19 provides a check on the result of the complex logical operations and causes the emission of advance and recording orders if applicable.

At this instant, the values $s_p^a$, $s_p^b$ which have been detected in $L_p$ pass into the memories $s^a_{p-\epsilon}$, $s^b_{p-\epsilon}$, since these will now act as references to detect the valid sequence in the following register. The analysis of the point is continued by examination of the contents of the following register.

To examine the contents of the following register, the same state 19 causes the analysis switch $P_3$ to progress by one step.

During the interval $t=20$, $t=0$, the information has time to pass through the analysis selector to the sequence detection circuits.

Not all the cycles of $21t$ are strictly identical. The index $p$ can be written $p=7+\epsilon q$ where $\epsilon$ has the values $\pm 1$ and $q$ is an integer.

The three first cycles of $21t$ correspond to the analysis of registers $L_7$, $L_8$, $L_6$ with respectively $q=0$; $q=1$, $\epsilon=+1$; $q=1$, $\epsilon=-1$. These cycles possess a particular nature.

The contents of register $L_7$ are examined for $q=0$, and since one extremity of the sequence to be retained ($s_7^a$) is already known, a special circuit for sequence detection in $L_7$ is used to determine the other extremity $s_7^b$.

After register $L_7$, the contents of register $L_8$ are examined, unless a point rejection order has been given. No decision can be taken during this cycle of $21t$. The end of the following cycle must be awaited, during which the contents of register $L_6$ are examined to ascertain the side towards which the tangent is directed and whether the point in question is a terminal point.

These three cycles of particular nature are followed by five identical cycles, with $2 \leq q \leq 6$. Accordingly, in the most unfavorable case eight cycles of $21t$ are needed to validate or reject a singular point.

The condition monitor P of the characteristic point detector 6 (FIG. 1) becomes operative at the instant $t=152$. There is thus time to perform 25 cycles of $21t$ before $t=680$, which is the most unfavorable case renders it possible to process three points ($3 \times 8=24$) on the same line. Experience proves that this is sufficient.

The counter $C_7$ permits supervision of the sequential progress of the successive analyses of the different registers $L_p$. It indicates the value of the parameter $q$.

It has already been stated that not all the cycles of $21t$, during which the contents of register $L_p$ are analyzed, are identical. For definite values of $q$, and thus of $p$ (since $p=7+\epsilon q$), it is necessary to "itemize" the operation of some circuits. This is performed simply by means of a decoder which supplies appropriate signals depending on the particular state of the counter $C_7$. To prevent the appearance of interference signals at the output point of the decoder, the counter $C_7$ uses reflexive binary code.

The respective states 1 to 8 of counter $C_7$ correspond to the following operations:

| | | | |
|---|---|---|---|
| 1 | $q=0$ | $L_7=L_7+0$ | Is being analyzed |
| 2 | $q=+1$ | $L_8=L_7+1$ | Do. |
| 3 | $q=-1$ | $L_6=L_7-1$ | Do. |
| 4 | $q=2$ | $L_7+2\epsilon$ | Do. |
| 5 | $q=3$ | $L_7+3\epsilon$ | Do. |
| 6 | $q=4$ | $L_7+4\epsilon$ | Do. |
| 7 | $q=5$ | $L_7+5\epsilon$ | Do. |
| 8 | $q=6$ | $L_7+6\epsilon$ | Do. |

The counter $C_7$ is thus alone in controlling the analysis of the first three registers ($L_7$, $L_8$, $L_6$). The value of $\epsilon(\pm 1)$ must then be known to determine which of the two registers equidistant from $L_7$ is to be analyzed by the coder.

The operation of the counter $C_7$ is as follows: it is reset to naught at the beginning of the analysis, and each time a cycle of $21t$ is performed, it advances its count by one step; this advance is caused by the condition 19 of the counter $C_6$.

As soon as a decision is verified during a condition 19, the counter $C_7$ is reset to 0 to take over the following singular point contingently contained in $L_7$.

The analysis switch $P_3$ is a directional 13-way selector. Each of the 13 input terminals is connected to the output terminal of a corresponding register division $L_p$. The information available at one of these input terminals is then selected and travels to the output terminals, where it is recorded.

The input terminal selected will be determined by the values of $q$ and of $\epsilon$. Three decoding combinations are differentiated: registers $L_6^1$, $L_7^1$, $L_8^1$ depend only on $q$; registers $L_1^1$ to $L_5^1$ depend on $q$ and on $\epsilon=-1$; and registers $L_9^1$ to $L_{13}^1$ depend on $q$ and on $\epsilon=+1$.

There are two sequence detectors: a detector $Q_{10}$ of sequences in $L_7$, and a detector $Q_{20}$ of sequences in $L_p$ where $p \neq 7$.

The detector $Q_{10}$ detects the point $s_7^b$ which forms the other end of the sequence of the logical value $v$ having the origin $s_7^a$ in register $L_7$. Since this circuit is specialized for the contents of register $L_7$, it is not supplied through the analysis switch; it examines the contents of register $L_7$ at the output of division $L_7^1$.

This detector $Q_{10}$, which operates in essentially sequential manner, includes an order comparator $Q_{11}$, a logical value comparator $Q_{12}$, a $(\nu-\bar{\nu})$ transition detector $Q_{13}$, a discriminator $Q_{14}$, and a directional detector $Q_{15}$. $\bar{\nu}$ is the opposite logical value to value $\nu$.

Order comparator $Q_{11}$ compares the contents of the counter $C_6$ with the value $s_7^a$. When these two values are equal, it generates a signal indicating that the logical value of the point $s_7^a$ passing through the division $L_7^1$ is that which is taken over by the sequence detector at this moment.

Valency comparator $Q_{12}$ compares the logical value $\nu$ examined by the sequence detector at any instant to the value of the singular point in course of processing.

This circuit provides a response every time the logical values coincide, and renders it possible to deal with either black points on the fingerprint image ($\nu=0$) or white points ($\nu=1$) with only a single circuit.

Transition detector $Q_{13}$ provides a signal each time two successive logical values are different during examination of the contents of $L_7$.

The limits of sequences which are the points of interest in analysis are indicated by logical value transitions. A transition $\bar{\nu}\ \nu$, referred to as rising front, indicates the beginning of a sequence $\nu$; a sequence $\nu\ \bar{\nu}$ referred to as descending front, indicates the end of a sequence $\nu$.

For $j=1$ and $j=15$, the abscissae of the extremities of a segment, a simple logic circuit indicates the presence of a rising or descending front if the valency of the corresponding points is $\nu$.

Discriminator $Q_{14}$ is the deciding element of the detector $Q_{10}$. It comprises two flip-flops controlled by a logic circuit combining the signals emitted by the order comparator $Q_{11}$ and the transition detector $Q_{13}$. A circuit which provides an instruction for recording $s_7^b$ is situated at the output of the discriminator $Q_{14}$.

Direction detector $Q_{15}$ contains a flip-flop which, by a signal S, indicates the relative value of $s_7^a$ and $s_7^b$:

for $s_7^a \leq s_7^b$, $S=0$ for $s_7^a > _7^b$, $S=1$.

This flip-flop is reset to 0 when the following singular point is taken over.

Detector $Q_{20}$ of sequences in $L_p$ renders it possible to order the recording of $s_p^a$ and $s_p^b$, knowing $s^a_{p-\epsilon}$ and $s^b_{p-\epsilon}$. Like the detector $Q_{10}$ it can generate several orders in each group ($a$ or $b$), but it is the last of each group which is the valid one.

It comprises similar elements to the detector $Q_{10}$: order comparators $Q_{21a}$, $Q_{21b}$, logical value comparator $Q_{22}$, transition detector $Q_{23}$, discriminator $Q_{24}$.

Comparator $Q_{21a}$ compares the instantaneous contents of the counter $C_4$ to the value $s^a_{p-\epsilon}$ recorded in its corresponding memory. Coincidence of these values generates a signal.

Comparator $Q_{21b}$ is a similar circuit to comparator $Q_{21a}$, and is intended for the other extremity of the last known sequence, the value $s^b_{p-\epsilon}$.

Logical value comparator $Q_{22}$, identical to that of the detector $Q_{10}$, compares the logical value passing the output of the analysis switch to that of the singular point studied (stored in the memory N).

Transition detector $Q_{23}$ is identical to the transition detector $Q_{13}$ in construction and operation.

Discriminator $Q_{24}$ comprises two flip-flops like the discriminator $Q_{14}$.

One order only was needed, in the sequence detector $Q_{10}$, for recording in the memory $s^b_{p,\epsilon}$ since the point in course of processing is $s_7^a$, by definition, and the extreme point of the sequence in $L_7$ is $s_7^b$. In another register $L_p$, if a first sequence extremity and then a second are encountered, the recording in the memories $s_p^a$ or $s_p^b$ should be performed by imparting to the segment $s_p^a\ s_p^b$ the same orientation as to the segment $s_7^a\ s_7^b$. This choice is made by the recording switch $Q_{15}$ by means of the logical function $S$.

A sequence is always present in the register $L_7$ (for a single division in the limiting case). A flip-flop of indicator $Q_{28}$ indicates whether there is a satisfactory $L_p$ sequence, during each cycle of the counter $C_4$. The flip-flop output is denoted NF. There is a sequence in $L_p$ for $NF=1$; there is none for $NF=0$, and the outline of the print line is interrupted.

The sequence detectors are equipped with memories $Q_{30}$ which provisionally store the abscissae of the extremities of the sequences.

To follow the outline from one register to the next, the values $s_p^a$, $s_p^b$ must be memorized for each register $L_p$, as well as the corresponding values of the preceding register, $s^a_{p-\epsilon}$, $s^b_{p-\epsilon}$. Special memories are also required to retain $s^a_8$, $s^b_8$, whilst $L_6$ is being examined. A total of six memories is thus needed, coordinated with the operation of the sequence detectors. They are: $Q_{33}(s^a_{p-\epsilon})Q_{32}(s^b_{p-\epsilon})$, $Q_{33}(s_p^a)$, $Q_{34}(s_p^b)$, $Q_{35}(s_8^a)$, $Q_{36}(s_8^b)$, where the value in parentheses is that stored by the respective memory. The circuit $Q_{40}$ determines the polarity of $\epsilon$ by means of two memories detecting, espectively, the presence of a sequence in $L_6$ or the presence of a sequence in $L_8$, coordinated with a decoder. Among the four conditions decoded, one corresponds to $\epsilon=+1$ and one to $\epsilon=-1$.

The processing method is the following:

The pattern of a print line manifests itself in the matrix H by the juxtaposition of a certain number of sequences of a given logical value, each contained in a register $L_p$. Such a sequence contained in the register $L_p$ is marked $s_p^a-s_p^b$, in which $p$ is the index of the register, and $a$ and $b$ designate the abscissae of the extremities of the sequence.

The point of origin of the sequence is $s_7^a$, the point recognized as being singular in the preceding operation. The other extremity of this sequence is $s_7^b$.

A search is first made in $L_8$ and then in $L_6$, as to whether there is a sequence having at least one division of the same valency as $s_7^a-s_7^b$ for which $$s_7^a \leq s \leq s_7^b.$$

If such a sequence is found at both sides of $L_7$ the point $s_7^a$ is evidently not a characteristic point, since it is not a "terminus" point, and is rejected.

The register adjacent to $L_7$ in which a sequence is found determines the section of the processing area in which the analysis is pursued. If this is $L_8$, the section is determined by $\epsilon=+1$. If it is $L_6$, the section is determined by $\epsilon=-1$. This indexing method renders it possible to define the registers of the matrix in the general form:

$$L_p = L_{7+\epsilon q}$$

with $\epsilon=\pm 1$, $2 \leq q \leq 6$.

The scanning of the registers will thus be performed in the following order:

$L_7$, $L_8$, $L_6$ [determination of $\epsilon\pm 1$], $L_{7+2\epsilon}$, $L_{7+3\epsilon}$, $L_{7+4\epsilon}$, $L_{7+5\epsilon}$, $L_{7+6\epsilon}$.

If the trace of the print line reaches one of the edges of the matrix H during this scanning, and if this trace corresponds to certain prescribed conditions, the singular point $s_7^a$ is recognized as being characteristic, and the coder performs a calculation of the tangent to the line at this point. If the pattern is considered to be abnormal, the point is scrapped.

The validation of a point accordingly is the result of the comparison of the numerical elements forming the trace with certain complex logical conditions which are logical functions of simpler conditions.

The simpler conditions are as follows:

A. $s_p^a=1$ (i)

B. $s_p^b=1$ (ii)

One of the extremities of the sequence picked up in the line $L_p$ reaches the left-hand edge of the processing memory.

C. $s_p^a=15$ (iii)

D. $s_p^b=15$ (iv)

One of the extremities of the sequence picked up in the line $L_p$ reaches the right-hand edge of the processing memory.

E. $s_7^a=s_7^b$ (v)

The sequence of the line $L_7$, contains no more than one element.

F. $|s_p^a - s_7^a| \leq 2$ (vi)

H. $|s_p^b - s_7^a| \leq 2$ (vii)

These inequalities characterize an increase in the abscissa which is very small in absolute value along the print line: the axis of the print line thus forms a very small angle with the vertical edge of the processing area.

$F_1$. $|s_p^a - s_7^a| \leq 1$ (vi)'

$H_1$. $|s_p^b - s_7^a| \leq 1$ (vii)'

As conditions (vi) and (vii), the angle with the vertical edge of the processing area being even smaller.

G. $|s_p^a - s_7^a| \geq 6$ (viii)

J. $|s_p^b - s_7^a| \geq 6$ (ix)

These inequalities express that the increase in the abscissa is very great along the print line: the axis of the print line thus forms a very small angle with the horizontal edge of the processing area.

The conditions (vi), (vii), (viii), (ix) are of significance, strictly speaking, only for the marginal registers $L_1$ and $L_{13}$, that is to say for $q=6$.

K. $(s_p^a - s_7^a) \cdot (s_p^b s_7^a) \leq 0$ (x)

The characteristic point has an abscissa within the portion formed by the extreme abscissae of the sequence picked up in the line $L_p$.

L. $(s_p^a - s^a_{7+\epsilon}) \cdot (s_p^a - s_p^b) > 0$ (xi)

Figure 8:
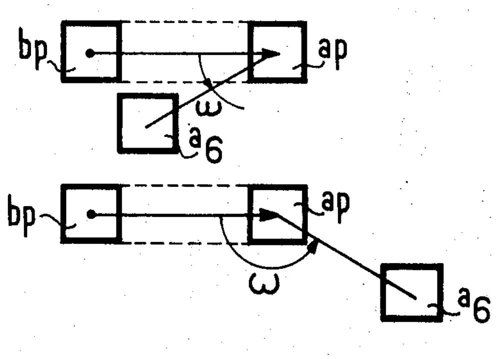
FIG. 8 illustrates the geometrical significance of an analogical condition.

This condition expresses that the angle ($\omega$) of the vector $a_6 b_p$ with the vector $b_p a_p$ is acute (see FIG. 8). If this condition is not established, the angle is obtuse ($\omega_1$), or a right angle for equality to naught.

M. $M=1$ for $q=6$ (xii)

The analysis bore successively on six lines, it reached the upper edge ($L_1$) or the lower edge ($L_{13}$) of the processing memory.

N. $NF=0$ (xiii)

This condition means that no satisfactory sequence appears in the register $L_p$: the print line is interrupted.

O. $(s_7^b - s_{7+\epsilon}) \cdot (s_p^a - s_7^a) \geq 0$ (xiv)

This condition is similar to (xi), with the point $a_7$ instead of the point $a_6$.

P. $P=1$ (xv)

This condition means that a satisfactory sequence is present at the same time in both $L_6$ and $L_8$.

Q. $Q=1$ (xvi)

This condition has the meaning $p=7$.

R. $R=1$ (xvii)

This condition has the meaning $p=8$.

The simple elementary conditions (i)—(xvii) are combined to form decision functions D as follows:

Decision function $D_1$ eliminates certain points for the following reasons:

- Irregularities in the trace of a line far from a terminal point;
- Terminal point too close to one of the left-hand or right-hand extremities of the processing matrix, particularly when the semitangent is directed towards this extremity;
- Elimination of one of two singular points situated on the same line (the better one is that which is situated at the side towards which the semitangent is directed if the slope is > 1 in absolute value, and that which is at the other side in the contrary case).

The decision function $D_1$ is set down as: $D_1 = \bar{F}_1 \cdot \bar{H}_1 \cdot K + A \cdot F + B \cdot H + C \cdot F + D \cdot H + \bar{E} \cdot G \cdot L + \bar{E} \cdot \bar{G} \cdot \bar{L} \cdot M \cdot \bar{O} = N + P + M \cdot \bar{O} \cdot G \cdot \bar{L} \cdot \bar{E} + O \cdot \bar{G} \cdot \bar{F} \cdot \bar{H} \cdot L \cdot L \cdot \bar{E} + (B+D) \cdot J \cdot \bar{Q}$ The decision function $D_1$ is a condition of rejection or acceptance of a singular point as a characteristic point.

The cases to which the various terms of the condition function $D_1$ correspond are as follows:

$D_1^1 = \bar{F}_1 \cdot \bar{H}_1 \cdot K$ $a_7$ is not characteristic: the line undergoes a deflection, but $a_7$ is not terminal.

$D_1^2 = A \cdot F$ $a_7$ is too close to the edge of the area for the calculation to be precise, and will be included in the next area.

$D_1^3 = B \cdot H$ $a_7$ is too close to the edge.

$D_1^4 = C \cdot F$ $a_7$ is too close to the edge.

$D_1^5 = D \cdot H$ $a_7$ is too close to the edge.

$D_1^6 = E \cdot G \cdot L$ The singular point $a_7$ is not the best for calculation of the tangent and is scrapped.

$D_1^7 = \bar{E} \cdot \bar{G} \cdot \bar{L} \cdot M$ The singular point is not the best for calculation of the tangent and is scrapped.

$D_1^8 = N$ The pattern of the print does not touch any edge of the matrix, this represents an interference trace.

Figure 9:
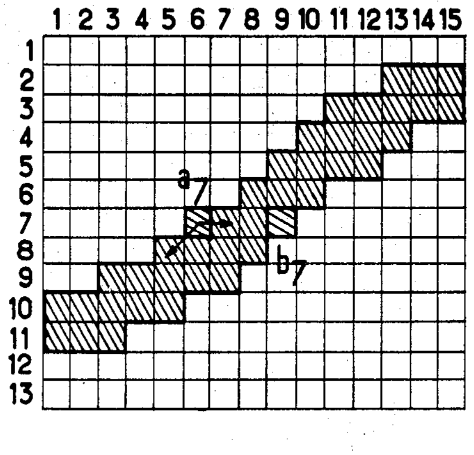
FIG. 9 is one form of outline of a print line which results in rejection of a singular point as not characteristic.

$D_1^9 = P$ This condition indicates that there is a satisfactory sequence in $L_8$ and in $L_6$. $a_7$ is not characteristic. This case is illustrated in FIG. 9.

$D_1^{10} = \bar{E} \cdot G \cdot \bar{L} \cdot M \cdot \bar{O}$ The slope of the tangent is very small.

$D_1^{11} = E \cdot \bar{F} \cdot \bar{G} \cdot \bar{H} \cdot L \cdot M \cdot O$ Irregularity in the print line.

$D_1^{12} = (B+D) \cdot \bar{J} \cdot \bar{Q}$ Condition of rejection intended to eliminate the singular points which could be calculated although they are not situated at a terminal point. This error may be caused by the fact that the content of the memory is limited.

The decision functions $D_2$ to $D_4$ are used in the choice of values in the calculation of the semitangent at a point accepted as being characteristic.

The condition $D_2$ is:

$D_2 = \bar{Q} \cdot \bar{R} \cdot M \cdot (B+D) \cdot J + \bar{E} \cdot G \cdot \bar{L} \cdot M \cdot O + E \cdot \bar{F} \cdot \bar{G} \cdot \bar{H} \cdot M$ In all the cases covered by $D_2$ the calculation of the semitangent is performed by means of:

$$\Delta x = s_p^b - s_7^a \qquad \Delta y = q$$

Figure 10:
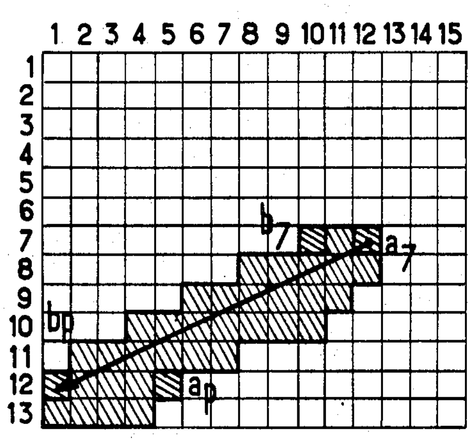
FIG. 10 shows a first case for calculation of the semitangent at a characteristic point.

FIG. 10 illustrates a case of application of the decision $D_2$ for calculation of the semitangent. This is the case $D_2^1$.

Decision $D_3$ is:

$D_3 = (\bar{E} \cdot \bar{F} \cdot \bar{G} \cdot \bar{H} \cdot L \cdot M) \cdot \bar{O} + E(G \cdot \bar{H} \cdot M)$ In the cases covered by $D_3$, the tangent is calculated by means of:

$$\Delta x = s_p^a - s_7^a \qquad \Delta y = q$$

Figure 11:
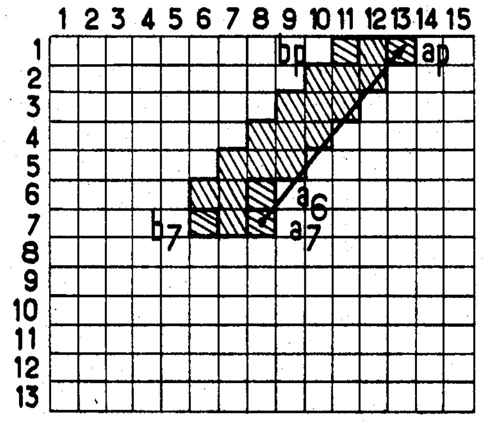
FIG. 11 is a second case for calculation of the semitangent.

FIG. 11 shows a case of application of the decision $D_3$ for calculation of the semitangent.

Decision $D_4$ is:

$$D_4 = (F+H) \cdot M$$

In the cases covered by $D_4$, the tangent is calculated by means of:

$$\Delta x = s_p^a - s_{7+\epsilon} \qquad \Delta y = \epsilon(q-1)$$

Figure 12:
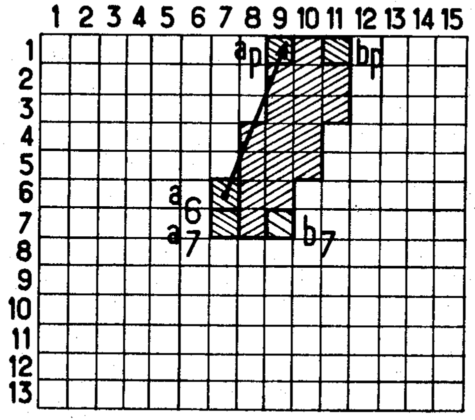
FIG. 12 is a third case for calculation of the semitangent.

FIG. 12 illustrates a case of application of the decision $D_4$ for calculation of the semitangent.

The print coder finally provides the following information, which (on instructions given to a transfer circuit $T_3$ by recording and advance order circuit S), are placed on record in an intermediate memory Y before being recorded:

$y, g, j$, which determine the position of the point; and which render it possible to calculate the tangent at this point.

Figure 13:
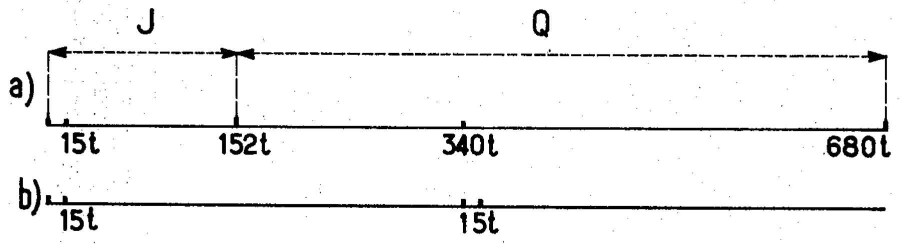
FIG. 13 is a simplified chronological diagram or timetable of the operation of the apparatus.

FIG. 13 gives a simplified form of a general "timetable" of the different stages of operation. It comprises two graphs (a) and (b). The graph (a) relates to the processing memory. During a complete cycle of $680t$, the information is fed into the memory during $15t$; the processing in the cyclic register J then occurs between $15t$ and $152t$. The processing in the sequence detectors occurs from $156t$ to $680t$. The graph (b) relates to the progress of the data in the register R: it occurs twice during a cycle of $680t$: between 0 and $15t$, and between 340 and $355t$.

Figure 14:
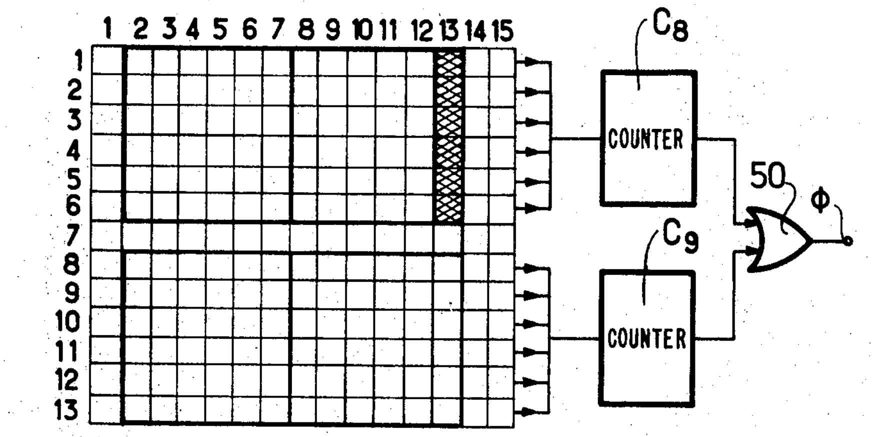
FIG. 14 is a diagram of a device for elimination of leading points.

FIG. 14 is a block diagram of the circuit for elimination of leading points.

The circuit for elimination of leading points effects systematic elimination of all the points which would be considered as singular by the coder because a print line abuts on an area of uniform valency, whether being an edging of the photograph to be analyzed, or an internal spot of the fingerprint image caused, for example, by a scar on the finger carrying the print.

It is clear that the coder will accept as a singular point any point of contact between a print line and a uniform area of opposed logical value. It has accordingly been decided to eliminate from the processing all the points situated on the contour of such an area or spot, referred to as leading points.

The principle consists of detecting, in the processing matrix H, a spot of minimum size too great to be a line element. The size and shape of this spot have been chosen in such manner that it may be inscribed with a high degree of probability in an area of uniform tint considered to be suspect: a square shape of six by six steps has been adopted. A round shape would have been more justified, but the square results in simpler circuits.

The circuit comprises two identical subassemblies which examine at the two sides of $L_7$, respectively, if there is such a square of six by six steps. Each one essentially comprises a counter $C_8$, $C_9$ respectively, whose output points are connected by an OR gate 10, from which issues a signal W for suppressing the leading point.

A square contained in the registers $L_1$ to $L_6$ (for example) is located in the following manner:

During feed of another line of data into the processing matrix H, a circuit samples the logical values of six points forming a column and situated in the divisions $L_1^1$, $L_2^1$, $L_3^1$, $L_4^1$, $L_5^1$, $L_6^1$, of matrix H.

During the 15 instants *t* of this feeding, the corresponding counter $C_8$ or $C_9$ operates in the following manner:

It is at naught at the beginning, and passes to 1 if a column of six identical logical values appears. If no column is detected, the counter is reset to naught, if it has not reached the condition 6. If a column is detected whose valency is contrary to that of the column which had been detected at the preceding instant, the counter is reset to 1 (case of strictly vertical print lines). If the counter reaches the state 6 at a given moment of the sequence, it remains blocked until the infeed of a following line: this state 6 indicates the presence of a minimum size spot at the side of $L_7$ corresponding to the counter; if one of the two counters reaches its state 6, the point is considered as a leading point.

What I claim is:

1. A device for identifying a pattern consisting of lines and points on the lines which are significant of the pattern, the device comprising: coder means producing electrical signals each significant of a point on the pattern to be identified: first circuit means for rejecting points derived from said coder means which are not singular; second circuit means for rejecting at least some points from said first circuit means which are not characteristic; third circuit means for examining each singular point not rejected by said first or second circuit means and for calculating the slope of the tangent to the pattern line relative to an arbitrary reference axis at only those points which are characteristic; fourth circuit means for rejecting leading points examined by said third circuit means arranged to pass only characteristic points to its output; fifth circuit means for selecting a group of a preselected number of characteristic points arranged in a predetermined order and for calculating, from the arbitrary tangent slopes and coordinates of the points derived from said third circuit means, data significant of a closed figure with straight sides joining the points in the predetermined order; and sixth circuit means for comparing data significant of at least one such closed figure of an unknown pattern with data significant of such figures of known patterns and for indicating coincidence of the unknown pattern with a known pattern when a preselected number of such figures are common to the two patterns.

2. A device as claimed in claim 1, wherein said pattern from which said coder means produces electrical signals is a fingerprint pattern.

3. A device as claimed in claim 1, in which said first circuit means is connected to receive the coder output signals via a processing memory for temporarily retaining a prescribed number of said signals in a matrix array; said first circuit means being provided in the form of a singular point detector for examining in turn each of the signals in the matrix array together with a prescribed number of neighboring signals and for identifying from such examination any signals significant of singular points; said first and second circuit means being connected via a singular point memory for temporarily holding signals significant of any singular points identified by the singular point detector; in which a monitor is provided for controlling operation of the singular point memory and singular point detector; in which said second circuit means and third circuit means are combined in a characteristic point detector for determining, from the signal significant of a singular point stored in the singular point memory, and from the signals significant of points surrounding said singular point, the slope of the tangent to the pattern line at said point; said fourth circuit means being provided in the form of a leading point detector for examining a relatively large area around each point to determine if it is a leading point and for canceling any leading points appearing at the output of the characteristic point detector, thereby allowing only characteristic points to take part in the identification process; and further including a recorder for making a record of the coordinates and tangent slopes of any characteristic points, a library for storing data, transferring means for transferring such details of the characteristic points into said library for permanent storage, and a timer providing signals for synchronizing operation of the elements of the device.

4. A device as claimed in claim 3, in which said coder comprises a conventional television camera, a threshold circuit, and first and second majority decision circuits.

5. A device as claimed in claim 4, in which said television camera is arranged to view, in successive, vertically spaced, horizontal scans controlled by time base signals from the timer, the image of the pattern and to produce video signals significant of the pattern image.

6. A device as claimed in claim 5, in which the threshold circuit is arranged to receive video signals from the television camera and transmit only those of magnitudes greater than a predetermined threshold value, to provide binary coded first video-logical signals.

7. A device as claimed in claim 6, in which the first majority decision circuit is connected to receive at its input an uneven number of successive first video-logical signals from one horizontal scan of the television camera and to provide a second video-logical signal of the same logical value as the first video-logical signal value of which there is a greater number.

8. A device as claimed in claim 7, in which the second majority decision circuit is connected to receive at its input an uneven number of second video-logical signals, one from each of the same number of successive horizontal scans, which represent a vertical line on the pattern image, and to provide an output signal of the same logical value as the second video-logical signal value of which there is a greater number.

9. A device as claimed in claim 8, in which the processing memory comprises a number of shift registers which may be connected in series to form a single composite shift register, and at least one of which may have its output division connected to its input division so as to form a ring register.

10. A device as claimed in claim 9, in which the singular point detector comprises a transfer circuit, a search computer, and an analogue decision element.

11. A device as claimed in claim 10, in which the transfer circuit is connected to the processing memory to reproduce preselected signals held in the processing memory, and in which the search computer is connected to receive the reproduced signals from the transfer circuit and arranged to store the reproduced signals in a prescribed way for a prescribed time.

12. A device as claimed in claim 11, in which the preselected signals to be reproduced are signals corresponding to a number of points immediately surrounding the point being examined.

13. A device as claimed in claim 10, in which the search computer is a ring register which holds the reproduced signals for a prescribed time by cycling them around its divisions.

14. A device as claimed in claim 10, in which the analogue decision element is connected to receive signals from the search computer and adapted to provide a given output if the input signals fulfill a prescribed condition indicating that the point being examined is a singular point.

15. A device as claimed in claim 9, in which the monitor comprises a number of counters connected to receive signals from the timer and arranged to operate to control the singular point detector and the singular point memory and to provide signals identifying the point being examined.

16. A device as claimed in claim 15, in which the singular point memory comprises a second transfer circuit and a memory circuit, and in which the second transfer circuit is connected to receive instructions from the decision element of the singular point detector and signals from the monitor, and which operates to transmit to the memory circuit identifying signals from the monitor under the control of the decision element.

17. A device as claimed in claim 16, in which the identifying signals transmitted by the second transfer circuit identify a point classified as a singular point, and in which the second transfer circuit also transmits to the memory circuit clearing signals generated by the monitor and arranged to clear the singular point memory when all singular points in each group of signals corresponding to one scan line on the pattern image have been identified.

18. A device as claimed in claim 16, in which the memory circuit is arranged to store the identifying signals for a prescribed time limited by the clearing pulses from the monitor.

19. A device as claimed in claim 3, in which the characteristic point detector comprises a condition monitor, a sequence detector, and a second analogue decision element.

20. A device as claimed in claim 19, in which the condition monitor comprises first circuitry connected to the processing memory and operating to control the cycling of signals therein when at least one register of the processing memory is connected as a ring register, and operating to provide instructions to reconnect the register as a composite shift register and to advance the signals held in the register by one division to proceed to the processing of the next point; second circuitry connected to the output division of each register of the processing memory and operating to select any one of the said output divisions and to reproduce the signal occupying said division; and third circuitry operating to identify and record details of the register of which said output division is a part.

21. A device as claimed in claim 19, in which the sequence detector comprises first circuits connected to receive via the condition monitor successive signals from a given register of the processing memory, of which signals the first represents a singular point, and to detect and record details of the point at the remote end of a sequence of signals of the same logical value as the first signal and in the same register; second circuits connected to receive from the processing memory successive signals from registers on either side of the given register and to detect similar sequences of signals; memory circuits connected to record details of the points at the ends of each sequence; and third circuits connected to the condition monitor to provide a signal for controlling the selection of registers to follow said given register.

22. A device as claimed in claim 21, in which the second analogue decision element is connected to receive information stored in the memory circuits of the sequence detector and arranged to perform logical operations on this information to decide if a given singular point is a characteristic point and, if so, to calculate a unique property of a pattern line ending at said point.

23. A device as claimed in claim 22, in which the property calculated by the second analogue decision element is the slope of the tangent to the pattern line at said point.

24. A device as claimed in claim 3, in which the leading point detector comprises two counters and a suppressor circuit, and in which each of the counters is connected to receive signals from divisions of registers on a respective side of the central register of the processing memory and to advance by one step each time every such signal is of the same type, and to provide an output every time a prescribed number of such advances of one step have been made in succession, as indicated by the counter reaching a prescribed value.

25. A device as claimed in claim 24, in which the suppressor circuit is connected to receive the outputs from the counters and to provide a suppressor output signal whenever either counter indicates the presence of a leading point.

26. A device as claimed in claim 3, in which the recorder comprises an instruction element, a transfer circuit, a buffer memory and a recording device.

27. A device as claimed in claim 26, in which the instruction element is connected to receive instructions from the condition monitor and also data representative of successive characteristic points, in which the transfer circuit is connected to receive instructions and data from the instruction element and suppressor signals from the linear point detector, and arranged to transmit said data and instructions in the absence of a suppressor signal and in which the buffer memory is connected to receive said data and instructions and to store them temporarily.

28. A device as claimed in claim 26, in which the recording device is connected to receive the data from the buffer memory and is provided with means for making a permanent record of the data and for passing the data into a library.

29. A device as claimed in claim 18, in which the characteristic point detector comprises a condition monitor, a sequence detector, and a second analogue decision element.

30. A device as claimed in claim 29, in which the condition monitor comprises first circuitry connected to the processing memory and operating to control the cycling of signals therein when at least one register of the processing memory is connected as a ring register, and operating to provide instructions to reconnect the register as a composite shift register and to advance the signals held in the register by one division to proceed to the processing of the next point; second circuitry connected to the output division of each register of the processing memory and operating to select any one of the said output divisions and to reproduce the signal occupying said division; and third circuitry operating to identify and record details of the register of which said output division is a part.

31. A device as claimed in claim 30, in which the sequence detector comprises first circuits connected to receive via the condition monitor successive signals from a given register of the processing memory, of which signals the first represents a singular point, and to detect and record details of the point at the remote end of a sequence of signals of the same logical value as the first signal and in the same register; second circuits connected to receive from the processing memory successive signals from registers on either side of the given register and to detect similar sequences of signals; memory circuits connected to record details of the points at the ends of each sequence; and third circuits connected to the condition monitor to provide a signal for controlling the selection of registers to follow said given register.

32. A device as claimed in claim 31, in which the second analogue decision element is connected to receive information stored in the memory circuits of the sequence detector and arranged to perform logical operations on this information to decide if a given singular point is a characteristic point and, if so, to calculate a unique property of a pattern line ending at said point.

33. A device as claimed in claim 32, in which the property calculated by the second analogue decision element is the slope of the tangent to the pattern line at said point.

34. A device as claimed in claim 33, in which the leading point detector comprises two counters and a suppressor circuit, and in which each of the counters is connected to receive signals from divisions of registers on a respective side of the central register of the processing memory and to advance by one step each time every such signal is of the same type, and to provide an output every time a prescribed number of such advances of one step have been made in succession, as indicated by the counter reaching a prescribed value.

35. A device as claimed in claim 34, in which the suppressor circuit is connected to receive the outputs from the counters and to provide a suppressor output signal whenever either counter indicates the presence of a loading point.

36. A device as claimed in claim 35, in which the recorder comprises an instruction element, a transfer circuit, a buffer memory and a recording device.